United States Patent
Bruno

(10) Patent No.: US 7,564,203 B2
(45) Date of Patent: Jul. 21, 2009

(54) ACTUATOR WITH DC MOTOR AND WITH IRREVERSIBLE TRANSMISSION FOR MANEUVERING A ROLLER BLIND

(75) Inventor: Serge Bruno, Marnaz (FR)

(73) Assignee: Somfy SAS, Cluses (FR)

( * ) Notice: Subject to any disclaimer, the term of this patent is extended or adjusted under 35 U.S.C. 154(b) by 3 days.

(21) Appl. No.: 11/794,933

(22) PCT Filed: Jan. 9, 2006

(86) PCT No.: PCT/IB2006/000019

§ 371 (c)(1),
(2), (4) Date: Jul. 9, 2007

(87) PCT Pub. No.: WO2006/075222

PCT Pub. Date: Jul. 20, 2006

(65) Prior Publication Data

US 2008/0118235 A1    May 22, 2008

(30) Foreign Application Priority Data

Jan. 11, 2005 (FR) .................................. 05 00266

(51) Int. Cl.
*H02K 29/00* (2006.01)
(52) U.S. Cl. .................... 318/140; 318/139; 318/432
(58) Field of Classification Search .................. None
See application file for complete search history.

(56) References Cited

U.S. PATENT DOCUMENTS

| | | | | |
|---|---|---|---|---|
| 3,721,115 A | * | 3/1973 | Kearns | 73/9 |
| 4,645,991 A | * | 2/1987 | Ban et al. | 388/822 |
| 4,811,777 A | | 3/1989 | Chretien et al. | |
| 4,905,423 A | * | 3/1990 | van Laere | 451/461 |
| 4,956,590 A | * | 9/1990 | Phillips | 318/432 |
| 5,038,087 A | | 8/1991 | Archer et al. | |
| 6,236,177 B1 | * | 5/2001 | Zick et al. | 318/362 |
| 6,870,338 B2 | | 3/2005 | Walker et al. | |
| 7,218,027 B2 | * | 5/2007 | Neidhart | 310/239 |
| 2003/0136615 A1 | | 7/2003 | LaGarde et al. | |

FOREIGN PATENT DOCUMENTS

| | | |
|---|---|---|
| EP | 0 381 643 A | 8/1990 |
| EP | 0 976 909 A | 2/2000 |
| EP | 1 333 150 A | 8/2003 |
| FR | 2 720 806 | 12/1995 |

\* cited by examiner

*Primary Examiner*—Lincoln Donovan
*Assistant Examiner*—Renata McCloud
(74) *Attorney, Agent, or Firm*—Frommer Lawrence & Haug LLP; Ronald R. Santucci

(57) ABSTRACT

The actuator (ACT) comprises:
a DC motor (MOT) having an armature energized via brushes (B) and a bar commutator with segments (L) and driving the movable element (LD) by way of a mechanical transmission device (TRD), and
a device (DD) for detecting and counting the commutations occurring between the brushes (B) and the bar commutator segments (L), the mechanical transmission device (TRD) comprises a transmission element (BRK) such that, during the maneuvering phases of the movable element (LD), the supply current to the motor (MOT) is always non zero and always flows in the direction defined by the "motor" operation of the motor (MOT).

6 Claims, 2 Drawing Sheets

ACTUATOR WITH DC MOTOR AND WITH IRREVERSIBLE TRANSMISSION FOR MANEUVERING A ROLLER BLIND

This application is a 371 of PCT/IB2006/000019 filed on Jan. 9, 2006, published on Jul. 20, 2006 under publication number WO 2006/075222 A1 which claims priority benefits from French Patent Application Number 05 00266 filed Jan. 11, 2005, the disclosure of which is incorporated herein by reference.

BACKGROUND OF THE INVENTION

The invention relates to an actuator for maneuvering a movable element of a building.

These actuators allow the maneuvering of movable elements such as doors, gates, blinds, shutters, projection screens, and ventilation hatches fitted to buildings.

To control the maneuvering of these movable elements, it is beneficial to ascertain their position so as to determine when to cut off the supply to the motor at the end of travel of the element or if the latter is in an intermediate position.

PRIOR ART

U.S. Pat. No. 5,038,087 discloses a method applied to a DC motor with brushes on the armature making it possible to determine, by counting, the unwound position of a shutter whose wound-up position is detected by motor stop. The position is calculated by counting the commutations of the bar commutator segments on the brushes of the motor. However, such a method of counting is not reliable. Specifically, under operating conditions in which the movable element tends to drive the motor, the supply current to the motor may be zero. Under these conditions, it is impossible to detect variations in the current and hence to count the commutations.

Patent application EP 1 333 150 discloses correction procedures for partially solving the problems raised by such methods.

SUMMARY OF THE INVENTION

The aim of the invention is to provide an actuator that overcomes the drawbacks cited and affords improvements as compared with known prior art actuators. In particular, the actuator according to the invention allows reliable implementation of a method for determining the position and/or speed of rotation of a shaft of a DC motor by counting the commutations of its bar commutator segments on its brushes.

The actuator according to the invention is defined by claim 1.

Various embodiments of the actuator according to the invention are defined by dependent claims 2 to 6.

BRIEF DESCRIPTION OF THE DRAWINGS

The appended drawing represents, by way of example, an embodiment of an actuator according to the invention and the operating principle of a method of counting commutations.

Figure 1:
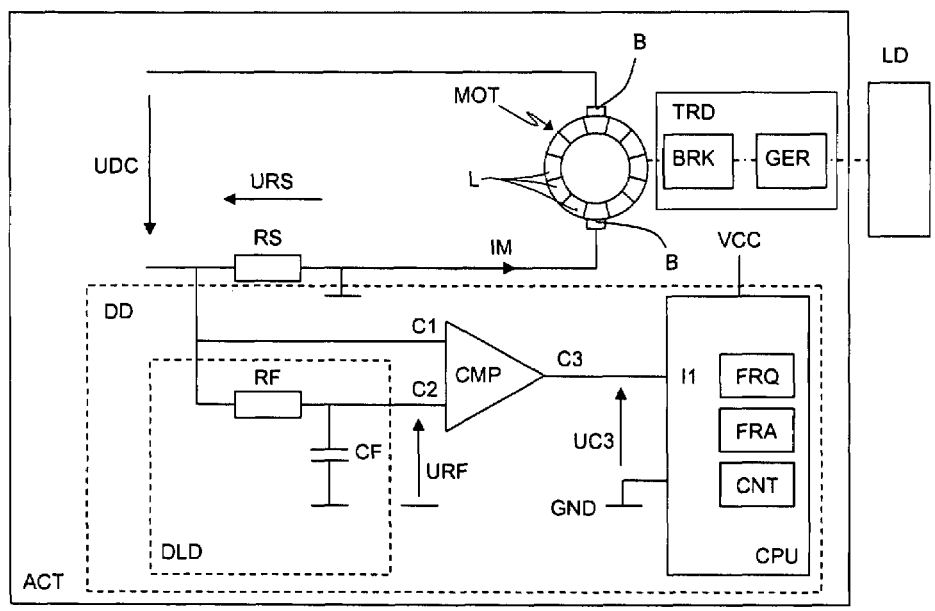
FIG. 1 is a diagram of an embodiment of an actuator according to the invention.

The actuator ACT represented in FIG. 1 is intended to drive a movable element LD fitted to a building. It comprises a DC motor of the type with a rotor armature winding, with bar commutator and brushes B. The field inductor is preferably made up of stator permanent magnets. The motor is kinematically linked to the movable element by way of a mechanical transmission device TRD. This device makes it possible in particular to immobilize the motor shaft when the motor is not energized so as to prevent the latter from being driven by mechanical actions exerted by the movable element.

In a first embodiment of the actuator, the transmission device TRD comprises a releasing brake BRK and a reduction gear GER, for example a planetary reduction gear train. The effect of the releasing brake is to make the motor absorb a non zero current during all the maneuvering phases of the movable element, regardless of the direction or intensity of the mechanical actions exerted by the movable element LD on the transmission device TRD.

Figure 3:
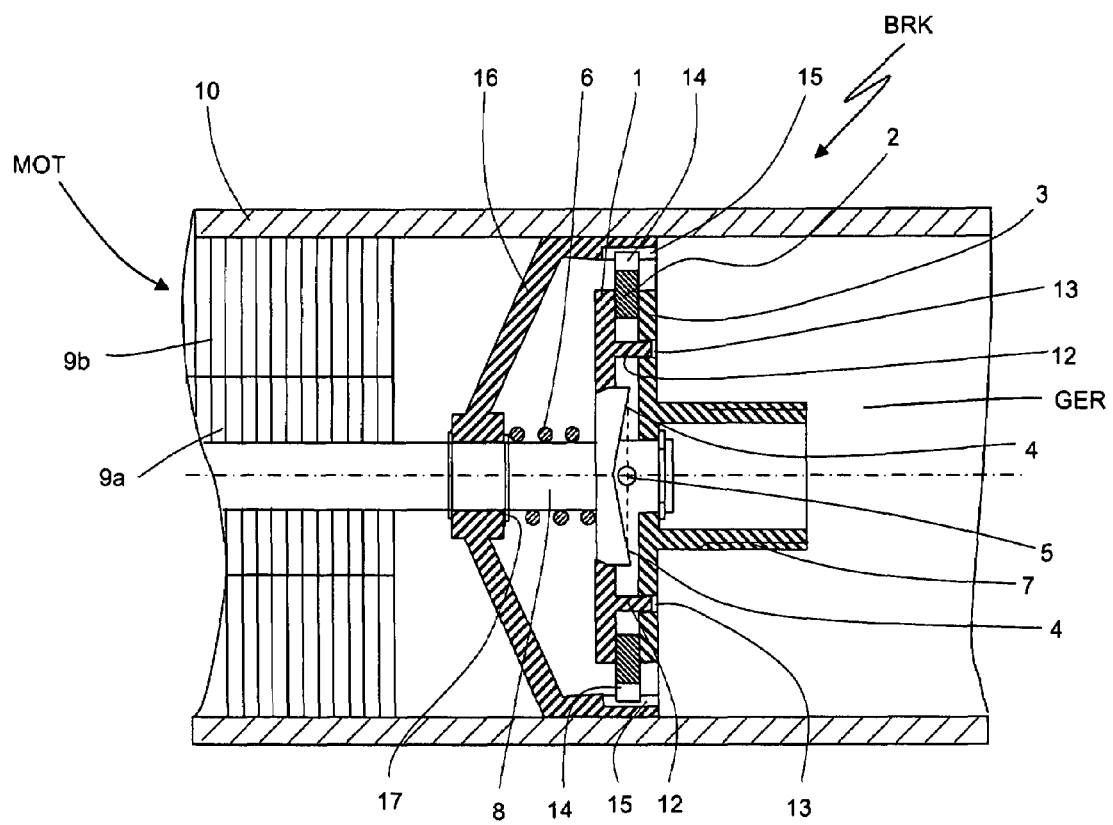
FIG. 3 is a longitudinal sectional view of an embodiment of a releasing brake used preferably in the actuator according to the invention.

An exemplary releasing brake that can be used in the actuator is described hereinbelow with reference to FIG. 3.

The brake device BRK is disposed between the motor MOT and the reduction gear GER. It comprises three juxtaposed brake disks 1, 2, 3. Two of them 1, 3 are mounted pivotably linked on a shaft 8 carrying the rotor of the motor MOT and the latter is glidingly linked in a casing 10 by means of radial projections 14 sliding in grooves 15 made in a bearing support 16 fixed to the casing 10. The disks 1 and 3 are glidingly linked together by means of spindles 12 present on the disk 1 and sliding in bores 13 made in the disk 3. The three disks are returned one against another by virtue of a spring 6 bearing on a stop element 17 and on the disk 1. The disk 3 is secured to a receiving shaft 7 making it possible to drive the reduction gear GER. The shaft 8 of the motor MOT is furnished with a radial drilling which houses a projecting pin 5. The disk 1 has a thickening in its central zone in which there is formed a surface in the form of a double ramp 4, which is symmetric with respect to the plane perpendicular to the plane of the drawing and containing the axis of the shaft 8, this surface cooperating with the pin 5 so as to part the disks and transmit the torque from the shaft 8 to the disk 1 when the motor is energized.

When the motor MOT is not energized, as represented in FIG. 1, the three disks 1, 2, 3, are pressed hard against one another and link the receiving shaft 7 driving a reduction gear GER to the casing 10. The rotational motion of this shaft 7 being prohibited, the reduction gear GER and, consequently, the movable element LD are immobilized in their position.

When the motor MOT is energized, the shaft 8 rotates with respect to the initially immobile disks 1, 2, 3. This rotational motion of the shaft 8 with respect to the disk 1 brings the pin 5 into contact with one of the ramps 4. The contact action between the pin 5 and the ramp 4 creates an axial loading against the thrust of the spring such as to part the disks and, on account of the slope of the ramp and of the resistive torque opposed by the reduction gear and the roller blind, the brake disks remain parted. The contact action between the pin 5 and the ramp 4 creates, on account of the slope of the ramp 4 and of the coefficient of friction between the pin 5 and the ramp 4, a tangential load which induces a mechanical torque of the shaft 8 on the disk 1. In this way, the rotational motion of the shaft 7 is freed and the mechanical power is transmitted from the shaft 8 to the reduction gear GER via the pin 5, the disk 1, and the disk 3 and, consequently, the movable element LD is driven. In the case where the movable element LD tends to drive the motor, a slight rotational motion of the disks 1 and 3 driven by the shaft 7 with respect to the shaft 8 causes the pin to move towards the bottom of the ramp 4 and causes the disks 1, 2 and 3 to be returned one against another. The motion of the pin with respect to the ramp 4 cannot continue beyond the position in which the pin is just in contact with the ramp, the latter, secured to the disk 1, being rotationally immobilized. In this way, an action of the movable element on the reduction gear GER cannot rotate the motor. It follows that, in such a device, the operation of the motor MOT is always of "motor" type and never of "generator" type. Moreover, the supply current energizing the motor is always greater than the no-load current of the motor.

The brake thus makes it possible to prevent the motion of the movable element LD when the motor MOT is not energized and to transmit a mechanical torque from the motor MOT to the reduction gear GER so as to maneuver the movable element when the motor MOT is energized.

In a second embodiment of the actuator (not represented), the transmission device TRD consists of an irreversible reduction gear. The effect of such a reduction gear is to make the motor absorb a non zero current throughout all the maneuvering phases of the movable element, regardless of the direction or intensity of the mechanical actions exerted by the movable element LD on the transmission device TRD.

The motor MOT is energized on the basis of a DC voltage UDC, provided by a battery or by a converter (not represented). This voltage UDC is applied to the terminals of the motor by virtue of power supply control means comprising a microcontroller CPU that controls commutation means (not represented) which enable the motor be turned in a first direction or in a second direction. The microcontroller is linked to a command receiver (not represented) that makes it possible to detect commands emitted following an action performed by a user or following an event detected by a monitor.

One of the functions of the control means is to cut the power supply to the motor when the shaft of the latter has reached a particular position, corresponding for example to a predefined intermediate position or an end-of-travel position of the movable element LD.

The position of the motor shaft, and hence the position of the driven movable element, is measured by counting. The control means also cause the power supply to the motor to be stopped and possibly cause the power supply to be reversed briefly so as to allow a reverse motion of the movable element should an obstacle be detected. This detecting of an obstacle may, for example, be done by detecting an abnormal slowing down of the motor. The control means must therefore make it possible to calculate the position and the speed of the movable element as accurately as possible.

The actuator represented in FIG. 1 furthermore comprises a device DD for detecting and counting the commutations occurring between the brushes B and the bar commutator segments L.

In a preferred embodiment of the detection and counting device DD, the armature current IM flowing around the motor is measured with the aid of a shunt resistor RS of low value, one terminal of which is linked to a first armature terminal of the motor and to the electric ground GND. Thus, the measurement voltage URS across the terminals of the shunt is low compared with the supply voltage UDC which is applied to the motor with the aid of relays (not represented).

The detection and counting device DD allows the fluctuations in the armature current IM that are caused by the commutations of the bar commutator segments as they pass on the brushes B to be transformed into a logic signal with two levels (high and low) UC3. This device comprises for example a comparator CMP with low hysteresis HYST and a phase-shifting circuit DLD.

The voltage URS across the terminals of the shunt RS is applied directly to a first input C1 of the comparator CMP. This voltage URS is also applied to the input of a phase-shifting circuit DLD that allows the output voltage URFA of the device to be delayed by a duration TD with respect to the voltage URS. This delay TD is less, or even much less, than the commutation period TS.

As represented in FIG. 1, the phase-shifting device may be embodied by a simple RC circuit consisting of a resistor FRO in series with a capacitor CF, the output voltage of the phase-shifting device being taken across the terminals of the capacitor CF. The product of the resistance and capacitance values RF×CF, or time constant, is less than the smallest of the commutation periods (that is to say the commutation period obtained when the motor shaft turns at its maximum speed).

In a preferred variant, the ratio of the time constant to the smallest period is equal to 0.3.

The delayed voltage URFA is applied to the second input C2 of the comparator CMP.

The output C3 of the comparator is connected to a digital input I1 of the microcontroller CPU. This input allows the incrimination by the logic signal UC3 from the comparator CMP, of a counter CANT each time the signal toggles to the high state. The input is also used as input for measuring the instantaneous frequency of toggling to the high state. This frequency is stored in a memory FRS of the microcontroller.

The microcontroller is equipped with means for counting, for measuring frequency, for sliding calculation of the average frequency over a given time interval and for calculating the frequency of rotation of the motor and/or the position of the motor as a function of the frequency of the logic signal from the comparator CMP or as function of the value stored in the counter CANT.

The power supply to the microcontroller is not represented in detail.

Figure 2:
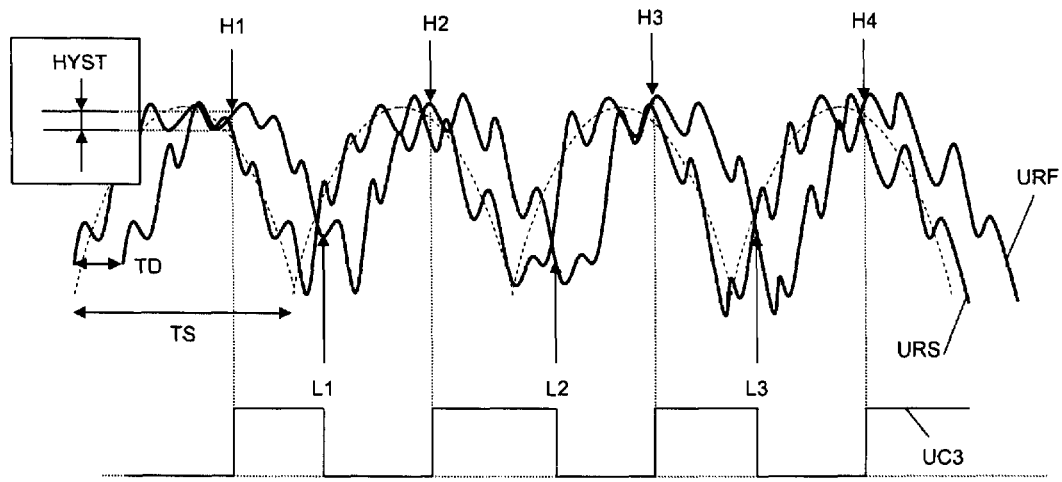
FIG. 2 is a diagram illustrating the principle of a method of detecting commutations.

FIG. 2 represents, by a dashed line, a voltage signal which is the image of the supply current which would be obtained in the absence of any interference signal. This signal is akin to a polyphone rectified current signal, comprising as many "phases" as segments L at the bar commutator. The situation represented is that of a steady state, that is to say a situation in which the speed and load conditions are stabilized. The voltage signal URS measured across the terminals of the shunt RS such as it is actually obtained is represented by a continuous curve, as is the delayed voltage signal URFA, simply shifted by a delay TD, which is small compared with the commutation period TS.

The representation given in FIG. 2 is simplified: specifically, the delay being obtained by a low-pass RC circuit, the interference signal ripples in the delayed voltage URFA should appear with a lower amplitude than those of the measurement voltage URS.

Here, the interferences of each signal have an amplitude which is usually greater than the hysteresis HYST of the comparator. If the comparison were made with a fixed reference voltage, then the comparator would switch several times per commutation period, hence resulting in erroneous measurements. Increasing the hysteresis would lead to a reduction in errors of this type, but would render the measurement device insensitive to small ripples in the current.

By comparing the voltage signal URS across the terminals of the shunt RS with a signal that is almost identical but simply shifted in time, it is possible to obtain a single toggling to the high state per period with a low or very low hysteresis, compared with the amplitude of the interferences.

Thus, the first time the output voltage UC3 of the comparator CMP toggles to the high state occurs at a date H1, as soon as the delayed voltage URF exceeds the measurement voltage URS by a quantity equal to the hysteresis HYST of the comparator. The return to the low state occurs, at a date L1, as soon as this voltage URF becomes less than the voltage URS by a quantity equal to the hysteresis.

It is understood that the measurement device continues to operate during a transient state of the armature current IM, for example during a significant increase followed by a decrease in the motor torque. Specifically, the transient state corresponds to a very slow evolution with respect to the duration of the commutations, and FIG. 2 can be considered with a slight regular upward (or downward) shift from commutation period to commutation period, with moreover a slight increase (or decrease) in the duration of the commutation period.

Through the use of a releasing brake or an irreversible reduction gear, it is guaranteed that, even in a driving load situation, the operation of the motor MOT is always of the "motor" type and never of the "generator" type. Thus, during a given phase of driving of the movable element, the current in the armature of the motor is not zero, does not change direction and may even possibly remain greater than the no-load current of the motor. When multiplied by the shunt resistance RS, the variations in this current are at least greater than the hysteresis HYST of the comparator.

It is obvious that numerous other devices for detecting and counting commutations may be used within the scope of the invention. It is for example possible to use a device as described in document EP-A1-0 689 054 from line 50 column 3 to line 49 column 6 with reference to FIG. 1 or as described in document DE 295 09 638 U1 in the second paragraph of page 5 and on page 6 with reference to FIG. 2. The contents of these documents as well as the content of document U.S. Pat. No. 5,038,087 are incorporated by reference with the present patent application. It is likewise possible to use a device in which the voltage across the terminals of a shunt traversed by the motor supply current is compared with a fixed reference voltage.

The invention claimed is:

1. An actuator for maneuvering a movable element of a building, comprising:
   a DC motor having an armature energized via brushes and a bar commutator with segments and driving the movable element by way of a mechanical transmission device,
   a device for detecting and counting the commutations occurring between the brushes and the bar commutator segments,
   the mechanical transmission device comprising a transmission element such that, during maneuvering phases of the movable element, regardless of the mechanical action of the movable element on the transmission device, the supply current to the motor is always non zero and always flows in the direction defined by the "motor" operation of the motor.

2. The actuator as claimed in claim 1, wherein the transmission element is such that, during the maneuvering phases of the movable element, regardless of the mechanical action of the movable element on the transmission device, the supply current to the motor is always greater than the no-load current of the motor and always flows in the direction defined by the "motor" operation of the motor.

3. The actuator as claimed in claim 1, wherein the transmission element comprises an irreversible reduction gear.

4. The actuator as claimed in claim 1, wherein the transmission element comprises a releasing brake.

5. The actuator as claimed in claim 4, wherein the releasing brake is of the ramp type.

6. The actuator as claimed in claim 5, wherein the releasing brake comprises brake disks disposed opposite one another, an elastic means returning the disks one against another and ramps cooperating with means when the motor shaft of the motor is driven, so as to part the brake disks against the action of the elastic means and to transmit a mechanical torque from the motor shaft to a receiving shaft secured in rotation with one of the brake disks pivotably linked with the motor shaft, the receiving shaft being kinematically linked to the reduction gear and wherein it comprises a juxtaposition of disks that are alternately linked to the motor shaft and to a casing by gliding links, the disks of the ends of the juxtaposition being linked to the motor shaft.

* * * * *